United States Patent [19]

Terry, Jr.

[11] Patent Number: 4,564,779
[45] Date of Patent: Jan. 14, 1986

[54] DYNAMOELECTRIC MACHINE STATOR USING CYLINDRICAL KEYBARS

[75] Inventor: Vincent G. Terry, Jr., Beverly, Mass.

[73] Assignee: General Electric Company, Lynn, Mass.

[21] Appl. No.: 650,392

[22] Filed: Sep. 14, 1984

[51] Int. Cl.⁴ .................................. H02K 1/12
[52] U.S. Cl. .................................. 310/258; 310/42; 310/91; 29/596
[58] Field of Search ............... 310/42, 89, 91, 217, 310/180, 258, 254, 259, 216, 217; 29/596; 335/297, 298

[56] References Cited

U.S. PATENT DOCUMENTS

| | | | |
|---|---|---|---|
| 1,795,882 | 3/1931 | Noden | 310/42 |
| 3,708,707 | 1/1973 | Kranz | 310/258 |
| 3,787,744 | 1/1974 | Saito | 310/258 |
| 4,217,510 | 8/1980 | Detinko | 310/89 |
| 4,425,523 | 1/1984 | Detinko | 310/89 |

FOREIGN PATENT DOCUMENTS

| | | | |
|---|---|---|---|
| 1042971 | 11/1978 | Canada | 310/254 |
| 0561664 | 8/1980 | Canada | 310/268 |
| 0974758 | 4/1961 | Fed. Rep. of Germany | 310/254 |
| 1130913 | 7/1962 | Fed. Rep. of Germany | 310/42 |
| 0141095 | 4/1980 | German Democratic Rep. | 310/91 |
| 0088641 | 7/1981 | Japan | 310/91 |
| 0048107 | 7/1981 | Japan | 310/254 |

*Primary Examiner*—R. Skudy
*Attorney, Agent, or Firm*—James W. Mitchell

[57] ABSTRACT

Keybars for affixing stator core laminations to annular web plates of a stator frame include a cylindrical portion and a dovetail portion. The cylindrical portion is closely fitted within accurately bored axially aligned circular holes in the annular web plates. During preliminary assembly, the cylindrical portions of the keybars are inserted into the aligned bored cylindrical holes in the annular web plates with the dovetail portions facing radially inward. Due to the accuracy with which the bored cylindrical holes are positioned, chordal positioning of the keybars prior to welding is achieved with a jig positionable between adjacent keybars. During welding, the keybars are pulled radially inward to place all clearances between the circular portions and the bored cylindrical holes radially outward of the cylindrical portion.

2 Claims, 3 Drawing Figures

DYNAMOELECTRIC MACHINE STATOR USING CYLINDRICAL KEYBARS

BACKGROUND OF THE INVENTION

The present invention relates to dynamoelectric machines and, more particularly, to a keybar structure for interfacing a laminated core of a dynamoelectric machine to the supporting structural frame.

Large dynamoelectric machines such as, for example, large electric generators, employ cylindrical stator cores composed of stacked laminations of thin layers of a magnetic material. Conventionally, the stator core is built up within a cylindrical frame using dovetail keybars attached to the stator frame upon which dovetail slots in lamination segments are placed. When the entire stator core is completed, axial forces are applied to the ends of the stator core to retain the stator core as an essentially unitary mass.

In producing the stator core, a plurality of annular web plates are first aligned within a cylindrical outer wrapper plate. Then a set of, for example, 12 to 18 key bars are fitted each within axially aligned slots in the inner periphery of the annular web plates. Each key bar includes a dovetail extending radially therefrom toward the center of the stator core. Each lamination segment includes a plurality of equally spaced dovetail slots fittable upon the keybar dovetails.

The magnetic forces imposed on the stator core of a large dynamoelectric machine tend to deform the stator core into a slightly oval cross section. As the rotor of the large dynamoelectric machine rotates at a speed of, for example, 3600 RPM, the oval deformation rotates with it. Each point about the stator core thus experiences cyclic radial forces at a frequency of twice the rotational frequency of the rotor. A close fit between the keybar dovetails and the lamination dovetail slots is essential to avoid relative vibration of the laminations and keybars and the production of an annoying buzzing noise at twice the rotational frequency.

In a structure as large as the stator of a large dynamoelectric machine, it is difficult to establish and to maintain the level of precision required to permit accurate stacking of precisely fitting lamination dovetail slots onto keybar dovetails. The conventional approach to positioning the keybars includes initially providing oversize rectangular slots in the annular web plates into which rectangular keybars are placed. The keybars are then blocked into position and are affixed to the annular web plates using bridging U-rings which are welded to the keybars and to the annular web plates, effectively bridging the gaps produced by the oversize slots. Maintaining such alignment during the step of affixing the U-rings is complicated by the distortions produced by the relatively heavy welding which is employed. If a keybar misalignment prevents fitting the lamination dovetail slots thereon, it may be necessary to file or grind an edge of the dovetail to permit assembly. Such grinding may decrease the tightness of fit and thus contribute to vibration. An improved technique for providing more accurate alignment of the keybars is therefore desirable.

Substantial mechanical forces are imposed at the interface of the keybars and the annular web plates. The conventional use of rectangular oversize slots in the annular web plates may permit the development of stress concentrations, especially at the corners of the oversize slots which may contribute to crack initiation. A technique for reducing the possibility of stress concentrations at the interface between the keybars and the annular web plates is also desirable.

OBJECTS AND SUMMARY OF THE INVENTION

Accordingly, it is an object of the invention to provide a keybar assembly for permitting the stacking of a stator core which overcomes the drawbacks of the prior art.

It is a further object of the invention to provide a keybar and keybar interface to an annular web plate of a stator of a dynamoelectric machine which overcomes the drawbacks of the prior art.

It is a still further object of the invention to provide a method for producing a stator core for a dynamoelectric machine which provides improved accuracy in positioning of keybar dovetails and reduces stress concentrations at the interface between keybars and annular web plates.

It is a still further object of the invention to provide an interface between keybars and annular web plates of a stator of a dynamoelectric machine which substantially reduces the possibility of stress concentrations at such interface.

It is a still further object of the invention to provide apparatus and method for connecting a keybar to a plurality of annular web plates in which substantially reduced thermal distortion of said keybars is produced.

Briefly stated, the present invention provides apparatus and method for affixing stator core laminations to annular web plates of a stator frame using keybars having a cylindrical portion and a dovetail portion. The cylindrical portion is closely fitted within accurately bored axially aligned circular holes in the annular web plates. During preliminary assembly, the cylindrical portions of the keybars are inserted into the aligned bored circular holes in the annular web plates with the dovetail portions facing radially inward. Due to the accuracy with which the bored circular holes are positioned, chordal positioning of the keybars prior to welding is achieved. During welding, the keybars are pulled radially inward to place all clearances between the cylindrical portions and the bored circular holes radially outward of the cylindrical portion.

According to an embodiment of the invention, there is provided apparatus for a stator of a dynamoelectric machine comprising a plurality of annular web plates, means for securing the annular web plates parallel to each other, a plurality of circular holes equally chordally spaced apart in an inner edge of each of the annular web plates, an axis of the circular holes being parallel to an axis of the stator, a perimeter of each of the circular holes being broken at an inner perimeter of its respective annular web plate to form an opening, the means for securing being effective for axially aligning corresponding ones of the circular holes in each of the annular web plates to form a plurality of sets of axially aligned circular holes, a plurality of keybars equal in number to the plurality of circular holes, each of the keybars including a cylindrical portion and a dovetail portion, the cylindrical portion being accurately fittable into one of the sets of axially aligned circular holes, the dovetail portion of each of the keybars being radially extendable through the opening toward a center of the stator, at least one weld bead at an interface between each of the circular holes and its keybar cylindrical portion whereby the keybars are rigidly affixed to the annular web plates, a plurality of lamination sectors, the lamination sectors being stackable to form a stator core, each of the lamination sectors including at least first and second dovetail slots and dovetail portions of an adjacent pair of the keybars being fittable within the first and second dovetail slots whereby the lamination sectors are secured to the annular web plates.

According to a feature of the invention, there is provided a method for assembling a stator of a dynamoelectric machine comprising aligning a plurality of annular web plates parallel to each other defining a cylinder, forming a plurality of equally chordally spaced apart circular holes in an inner edge of each of the annular web plates, each of the circular holes having an axis parallel to an axis of the cylinder, and a break at an inner perimeter of the annular web plate to form an opening, aligning corresponding ones of the circular holes in the plurality of annular web plates to form a plurality of sets of axially aligned circular holes, inserting a cylindrical portion of a cylindrical keybar into each of the sets of axially aligned cylindrical holes, extending a dovetail portion of each of the cylindrical keybars through the opening toward a center of the cylinder, rotationally aligning the dovetail portion to provide equal chordal spacing between all of the dovetail portion, applying a radially inward force to a keybar near an interface thereof with a circular hole whereby the cylindrical portion is pulled into contact with a radially inner portion of the circular hole, applying a weld bead to the interface while maintaining the radially inner force and repeating the steps of applying a radially inward force and applying a weld bead until all the interfaces between the cylindrical portions and circular holes include the weld beads.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a closeup end view of a cylindrical keybar interface of FIG. 2.

DETAILED DESCRIPTION OF THE PREFERRED EMBODIMENT

Prior to describing the present invention, a brief discussion of the prior art is included herein for providing a background for understanding the structure and benefits of the present invention.

Figure 1:
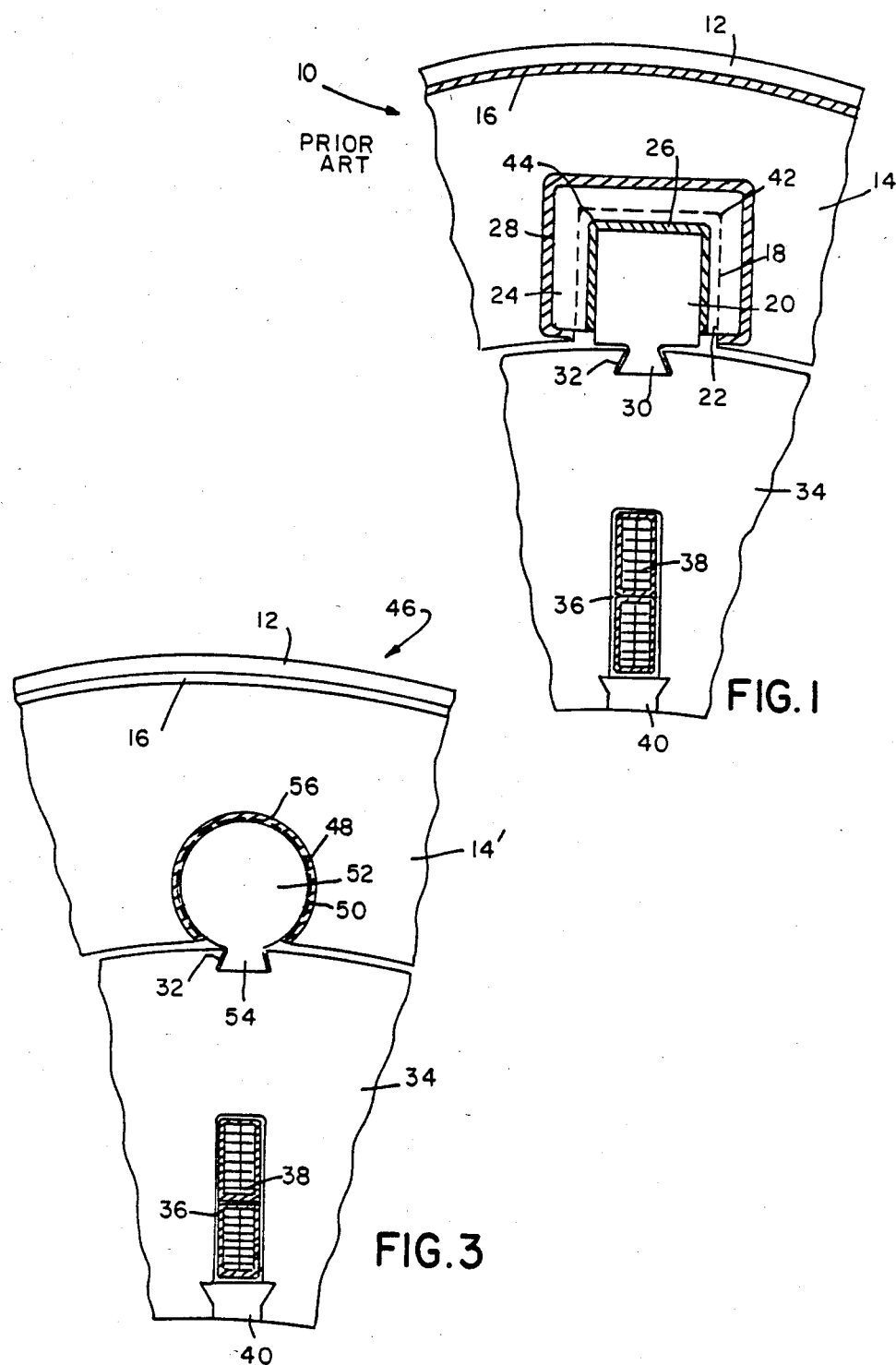
FIG. 1 is an end view of a keybar interface between a stator frame and a stator core lamination stack according to the prior art.

Referring now to FIG. 1, there is shown, generally at 10, a portion of a stator constructed according to the prior art. An outer wrapper plate 12, only a portion of which is shown, forms a full cylindrical wrapper defining the outer dimensions of stator 10. A plurality of annular web plates 14, only a portion of one of which is shown, are spaced axially apart within outer wrapper plate 12. In the illustrated construction of stator 10, annular web plates 14 are rigidly affixed to outer wrapper plate 12 using weld beads 16. In an alternate construction (not shown), annular web plates 14 may be rigidly affixed to spring bars which are, in turn, affixed to outer wrapper plate 12. For purposes of the present invention, to be described hereinafter, the direct and spring-bar constructions are considered to be equivalent and the present invention is indifferent to the particular construction selected.

A plurality of oversize rectangular slots 18, only one of which is shown, are evenly spaced about the inner perimeter of each annular web plate 14 in the prior-art device. The particular illustrated one of oversize rectangular slots 18 shown in FIG. 1 is accurately aligned with a corresponding oversize rectangular slot 18 in each of the other annular web plates 14. A rectangular keybar 20 is positioned within oversize rectangular slot 18 leaving a substantial clearance 22 between itself and oversize rectangular slot 18. A U-ring 24 bridges clearance 22, overlapping the surface of annular web plate 14 surrounding oversize rectangular slot 18. Rectangular keybar 20 is affixed to U-ring 24 by a weld bead 26, preferably at both sides of U-ring 24. Similarly, U-ring 24 is affixed to annular web plate 14 by a weld bead 28, also preferably applied on both sides of U-ring 24. That is, in the structure of the prior art, a total of four weld beads may be employed in affixing rectangular keybar 20 to annular web plate 14 using the intermediate structure of U-ring 24. A dovetail 30 extends radially inward from rectangular keybar 20. Dovetail 30 is engaged by a dovetail slot 32 in a lamination 34.

Also shown for completeness of description is one of a plurality of stator slots 36 provided in stator 10 for containing conventional current-carrying conductors 38. Conductors 38 are conventionally retained in stator slots 36 using dovetail bars 40.

The theory of fabrication upon which the prior art structure of FIG. 1 is based relies on the availability of clearance 22 about each rectangular keybar 20. Before affixing each rectangular keybar 20 to its corresponding annular web plate 14, it is blocked into place such that it is positioned with the required chordal spacing (bar-to-bar tangential spacing) and the required radial spacing to its neighbor. Clearances 22 permit adjustment of the positions of rectangular keybars 20 with respect to oversize rectangular slots 18 for achieving this chordal spacing. Once the chordal and radial spacing is achieved, weld beads 26 and 28 are formed to rigidly fix rectangular keybars 20 in position. This step injects a substantial amount of heat into annular web plates 14 and rectangular keybars 20 which may result in distortion of these elements and a resulting misalignment. If such misalignment interferes with the precision of fit between dovetail 30 and dovetail slot 32, an attempt to force a fit by removing material from dovetail 30 may result in looseness which, either immediately after construction or later when residual stresses have become relieved in use, may permit noise to be generated.

In addition to the possibility of permitting a loose dovetail fit to develop, the use of a rectangular shape in oversize rectangular slot 18 may permit stress concentrations to develop in corners 42 thereof which could possibly permit crack initiation to occur in that vicinity. A similar problem is possible at inner corners 44 of U-ring 24.

I have discovered that the required accuracy in establishing the chordal and radial spacing of keybars can be more easily and more accurately achieved by using a new apparatus and method which provides a new precision in initially positioning the keybars instead of purposely positioning them within clearance 22 so that they can later be blocked into the desired position. In addition, I have discovered how to substantially reduce, or even to eliminate, the development of stress concentrations at the interface between keybars and annular web plates of the sort described in the foregoing description of the prior art.

Figure 2:
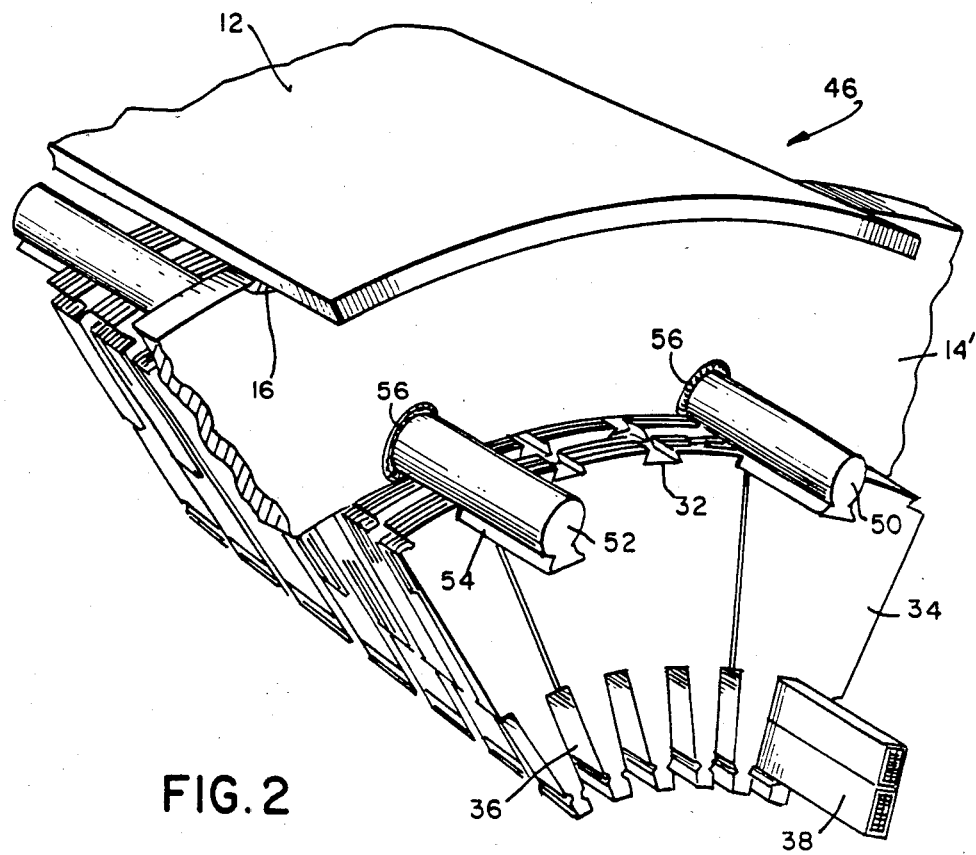
FIG. 2 is a perspective view of a portion of a stator of a dynamoelectric machine showing a cylindrical keybar construction according to an embodiment of the invention.

Referring now to FIGS. 2 and 3, a portion of a stator 46 is shown according to an embodiment of the invention. A circular hole 48 is bored at the radially inner edge of an annular web plate 14' (only one web plate is shown in FIG. 2). A cylindrical keybar 50 includes a cylindrical portion 52 accurately fittable within circular hole 48 and a dovetail portion 54 extending radially inward therefrom through the broken portion at the inner perimeter of the circular hole. A weld bead 56 affixes the perimeter of cylindrical portion 52 to the perimeter of circular hole 48.

In contrast to the problems of accurately machining oversize rectangular slots 18 of the prior art, I have discovered that it is possible to locate the positions of circular holes 48 about the inner perimeters of annular web plates 14' with enough precision using conventional factory machinery, that final blocking of cylindrical keybars 50 before forming weld bead 56 is unnecessary. Instead, a simple jig (not shown) may be employed to establish the chordal spacing of adjacent cylindrical keybars 50. The jig is also employed to apply a radially inner force on each cylindrical keybar 50 preparatory to and during welding in order to firmly contact the peripheral surface of cylindrical portion 52 in a known relationship with circular hole 48. That is, when cylindrical keybar 50 is pulled radially inward during welding, all clearances are positioned on the radially outward portion of cylindrical portion 52. In this way, a standard position is established which is substantially independent of manufacturing tolerances on fit and clearance between cylindrical portion 52 and circular hole 48. The accuracy of dovetail chordal and radial spacing achieved with the present invention is improved sufficiently that a precise fit between dovetail portions 54 and dovetail slots 32 is achieved throughout the process of stacking laminations 34 without the need for filing or grinding to force a fit and to thereby create a loose fit which may lead to vibration and buzzing in stator 46.

The use of circular hole 48 also eliminates the development of stress concentrations which may occur at the corners of the rectangular slots of the prior art. The resulting circular weld bead 56 is also more resistant to the development of stress concentrations than is the case with the substantially rectangular weld beads of the prior art. Finally, the close fit of cylindrical portion 52 in circular hole 48 eliminates the need for bridging elements such as U-ring 24 of the prior art. As a consequence, the amount of welding, and the resulting thermal distortion, is cut at least in half. That is, instead of one pair of weld beads for affixing U-ring 24 to rectangular keybar 20 and then a second pair of weld beads for affixing U-ring 24 to annular web plate 14, a single pair of weld bead 56, one on each side of annular web plate 14', is employed with the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for a stator of a dynamoelectric machine comprising;
   a plurality of parallel annular web plates;
   a plurality of circular holes equally chordally spaced apart in an inner edge of each of said annular web plates, an axis of said circular holes being parallel to an axis of said stator;
   a perimeter of each of said circular holes being broken at an inner perimeter of its respective annular web plate to form an opening;
   corresponding ones of said circular holes in each of said annular web plates being axially aligned to form a plurality of sets of axially aligned circular holes;
   a plurality of keybars equal in number to said plurality of circular holes;
   each of said keybars including a cylindrical portion and a dovetail portion;
   said cylindrical portion being accurately fittable into one of said sets of axially aligned circular holes;
   said dovetail portion of each of said keybars being radially extendable through said opening toward a center of said stator; and
   at least one weld bead at an interface between each of said circular holes and its keybar cylindrical portion whereby said keybars are rigidly affixed to said annular web plates.

2. Apparatus according to claim 1 comprising a plurality of lamination sectors, said lamination sectors being stackable to form a stator core;
   each of said lamination sectors including at least first and second dovetail slots; and
   dovetail portions of an adjacent pair of said keybars being fittable within said first and second dovetail slots whereby said lamination sectors are secured to said annular web plates.

* * * * *